(12) United States Patent
Jacobson

(10) Patent No.: US 7,133,822 B1
(45) Date of Patent: *Nov. 7, 2006

(54) NETWORK BASED DIAGNOSTIC SYSTEM AND METHOD FOR PROGRAMMABLE HARDWARE

(75) Inventor: Neil G. Jacobson, Mountain View, CA (US)

(73) Assignee: Xilinx, Inc., San Jose, CA (US)

(*) Notice: Subject to any disclaimer, the term of this patent is extended or adjusted under 35 U.S.C. 154(b) by 910 days.

This patent is subject to a terminal disclaimer.

(21) Appl. No.: 09/823,154

(22) Filed: Mar. 29, 2001

(51) Int. Cl.
G06F 9/455 (2006.01)
H03K 17/693 (2006.01)

(52) U.S. Cl. .......................... 703/28; 716/16
(58) Field of Classification Search ................ 703/28; 716/16
See application file for complete search history.

(56) References Cited

U.S. PATENT DOCUMENTS

| | | | |
|---|---|---|---|
| 5,109,353 A * | 4/1992 | Sample et al. ................ 716/17 |
| 5,463,638 A | 10/1995 | De Lange | |
| 5,535,406 A * | 7/1996 | Kolchinsky .................. 712/10 |
| 5,684,980 A | 11/1997 | Casselman | |
| 5,737,497 A | 4/1998 | Ballard | |
| 5,794,033 A * | 8/1998 | Aldebert et al. ............ 713/100 |
| 5,802,290 A | 9/1998 | Casselman | |
| 5,841,867 A | 11/1998 | Jacobson et al. | |
| 5,983,378 A | 11/1999 | De Wit et al. | |
| 5,995,744 A | 11/1999 | Guccione | |
| 6,023,565 A | 2/2000 | Lawman et al. | |
| 6,047,128 A | 4/2000 | Zander | |
| 6,074,432 A | 6/2000 | Guccione | |
| 6,078,736 A | 6/2000 | Guccione | |
| 6,112,020 A * | 8/2000 | Wright ........................ 716/17 |

(Continued)

FOREIGN PATENT DOCUMENTS

WO   WO 99/23588   5/1999

OTHER PUBLICATIONS

Krzysztof Badzmirowski, Marek Gonera and Jerzy Kern, "Diagnosis of Digital/Analog Measurement System with Application of Test Bus and Distributed Diagnostic Subsystem", IEEE 1998, pp. 490-495.*

(Continued)

*Primary Examiner*—Paul L. Rodriguez
*Assistant Examiner*—Dwin M. Craig
(74) *Attorney, Agent, or Firm*—Calfee, Halter & Griswold; LeRoy D. Maunu; Lois D. Cartier

(57) ABSTRACT

A system and method for diagnosing an electronic device remotely using a network is provided. The electronic device includes one or more programmable logic devices that are configurable. A diagnostic microcontroller functions to communicate to the programmable logic devices and to communicate to the network. To diagnose the electronic device, communication is established to the network and to a diagnostic/repair center. The diagnostic/repair center selects diagnostic commands and transmits them to the electronic device. The diagnostic microcontroller initiates the diagnostic commands on the one or more programmable logic devices to test their configuration and/or functionality. Test results are collected and transmitted back to the diagnostic/repair center for analysis. Based on the analysis, if appropriate, reconfiguration commands are sent to reconfigure the programmable logic device to correct identified errors.

32 Claims, 7 Drawing Sheets

U.S. PATENT DOCUMENTS

| | | | |
|---|---|---|---|
| 6,119,256 | A | 9/2000 | De Jong et al. |
| 6,134,707 | A | 10/2000 | Herrmann et al. |
| 6,144,933 | A * | 11/2000 | Guccione ............... 703/23 |
| 6,167,319 | A | 12/2000 | Harris et al. |
| 6,195,774 | B1 | 2/2001 | Jacobson |
| 6,205,579 | B1 | 3/2001 | Southgate |
| 6,226,779 | B1 | 5/2001 | Baxter et al. |

OTHER PUBLICATIONS

Neil G. Jacobson, "Internet Reconfigurable Logic, Leveraging PLD's to Enhance Embedded System Functionality", presented at Embedded Internet Workshop, Xilinx Inc., 2100 Logic Drive, San Jose, CA 95124, Oct. 1, 1999, pp. 1-9.

Richard Sevcik, "Internet Reconfigurable Logic", Apr. 1999, found at www.xilinx.com/xilinxonline/irlwpaper.htm, pp. 1-6.

Thomas Branca et al., "Remote Field Updates Using FPGAs", 1999, found at www.xilinx.com/xilinxonline/remote_wp.htm, pp. 1-9.

Mary Nolan et al.; "Use of adaptive Model-Based Reasoning for Embedded Diagnostics and Redundancy Management for Fault Tolerant Systems"; Copyright IEEE 1997; pp. 455-466.

Masaaki Inaba et al.; "The Development of Security System and Visual Service Support Software for On-Line Diagnostics"; Copyright IEEE 2001; pp. 45-48.

Nicholas H.M. Caldwell et al.; "Remote Instrument Diagnosis on the Internet"; IEEE Intelligent Systems; Copyright 1998 IEEE; pp. 70-76.

Nicola Mazzocca et al.; "Integrating Trace Logic and Petri Nets Specifications"; Proceedings of the Thirtieth Annual Hawaii International Conference on System Sciences ISBN 0-8186-7862-3; Copyright 1997 IEE; pp. 1-9.

* cited by examiner

US 7,133,822 B1

NETWORK BASED DIAGNOSTIC SYSTEM AND METHOD FOR PROGRAMMABLE HARDWARE

FIELD OF THE INVENTION

The invention relates generally to diagnostic and repair systems. It will be appreciated that the invention finds particular application to a system and method for diagnosing and reconfiguring programmable logic devices within a remote electronic device over a network.

BACKGROUND OF THE INVENTION

A programmable logic device is a digital integrated circuit capable of being programmed after its manufacture to provide a variety of different logic functions. Examples include a programmable logic device (PLD) and a field programmable gate array (FPGA). A PLD generally includes 'AND' gates, 'OR' gates, and Input/Output buffers, and functions differently depending on how it is programmed. An FPGA includes a gate array of logic elements (or macrocells), either gates or lookup table RAMs, flip-flops and programmable interconnect wiring. Typical FPGAs are reprogrammable since their logic functions and interconnects are defined by RAM cells. While a typical PLD may contain hundreds of gates, an FPGA may contain tens of thousands of logic elements.

Programming a PLD or FPGA is achieved using on-chip fuses, EPROM (UV erasable programmable read-only memory) circuits, EEPROM (electrically erasable programmable read-only memory) circuits, and RAM (random access memory) circuits which programmably create data paths and logic functions within the device that are specific to a user's design.

State of the art PLDs make use of one or more non-volatile memory cell arrays (e.g. EPROM, EEPROM, Flash EPROM, or Flash EEPROM) so that they can retain their configuration memory during power-down. Typically, these arrays are erasable, thereby allowing the desired functionality of the PLD to be re-programmed many times. This programmability makes a PLD family a flexible and powerful tool for a large number of unique applications where a common PLD is employed and only the chip's internal programming is varied.

Programmable logic devices are common in many electronic devices such as cellular phones, personal digital assistants, network switching equipment, etc. Although the PLDs are easily configured, it is difficult to diagnose and reconfigure them once they are embedded in the electronic device and in a user's possession. To perform a diagnostic test involves transporting the device to a repair center or having a technician make an on-site test. This is time consuming for the user and potentially expensive.

The present invention provides a new and unique system and method for diagnosing programmable logic devices that cures the above-referenced problems and others.

SUMMARY OF THE INVENTION

According to one embodiment of the present invention, a diagnostic device for diagnosing a programmable logic device that is embedded within an electronic system is provided. The diagnostic device includes an access controller that is configured to be embedded within the electronic device and that communicates to the programmable logic device therein. A diagnostic control module is configured to be embedded within the electronic system and transmits diagnostic signals via the access controller to the programmable logic device where the diagnostic signals are received from a network in response to a diagnostic request. The diagnostic control module receives output signals generated by the programmable logic device in response to the diagnostic signals and the output signals serve to diagnose the programmable logic device.

In accordance with a more limited aspect of the present invention, the access controller includes logic for communicating to the programmable logic device to control boundary scan logic within the programmable logic device.

In accordance with a more limited aspect of the present invention, the system includes a reconfiguration control module in communication with the access controller. The reconfiguration control module reconfigures the programmable logic device based on the output signals generated by the programmable logic device.

According to another aspect of the present invention, a self-contained electronic device is provided that includes a plurality of components selectively connected to each other to perform selected functions. The plurality of components include a programmable logic device. The self-contained electronic device includes a network communication interface that communicates to a network and logic for receiving diagnostic commands from a remote diagnostic device in communication with the network communication interface. A diagnostic controller embedded within the self-contained electronic device is in communication with the programmable logic device and includes a diagnostic control module that performs a diagnostic test on the programmable logic device in accordance with the diagnostic commands.

According to another aspect of the present invention, a method of diagnosing an electronic device is provided. The method includes communicating over a communications network to a remote electronic system that includes an embedded diagnostic/reconfiguration controller for performing diagnostic tests within the electronic system. The electronic system also includes a programmable logic device. Diagnostic commands are transmitted to the remote electronic system that cause the diagnostic/reconfiguration controller to perform diagnostic tests on the programmable logic device. The programmable logic device generates output signals in response to the diagnostic commands. The output signals are then received from the remote electronic system over the network. The output signals are then analyzed to determine if errors exist in the programmable logic device.

According to a more limited aspect of the present invention, the diagnostic commands include commands that are compliant with IEEE Standard 1532.

One advantage of the present invention is that an electronic device that is installed in the field or in a user's possession can be diagnosed remotely using a network.

Another advantage of the present invention is that an electronic device can have its programmable logic devices reconfigured from a remote diagnostic center using a network based on results from diagnostic tests.

Still further advantages of the present invention will become apparent to those of ordinary skill in the art upon reading and understanding the following detailed description of the preferred embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIG. 1 is an exemplary system diagram in accordance with the present invention.

DETAILED DESCRIPTION OF ILLUSTRATED EMBODIMENT

The following includes definitions of exemplary terms used throughout the disclosure. Both singular and plural forms of all terms fall within each meaning:

"Signals", as used herein, includes but is not limited to one or more signals, a bit stream, an algorithm, a routine, a program or the like. The term "commands" is synonymous with "signals."

"Software", as used herein, includes but is not limited to one or more instructions, routines, algorithms, modules or programs including separate applications or from dynamically linked libraries for performing functions as described herein. Software may also be implemented in various forms such as a servlet, applet or other type of application.

"Logic", as used herein, includes but is not limited to hardware, software and/or combinations of both to perform a function.

"Network", as used herein, includes but is not limited to the internet, intranets, Wide Area Networks (WANs), Local Area Networks (LANs), and transducer links such as those using Modulator-Demodulators (modems).

"Internet", as used herein, includes a wide area data communications network, typically accessible by any user having appropriate software.

"Intranet", as used herein, includes a data communications network similar to an internet but typically having access restricted to a specific group of individuals, organizations, or computers.

Figure 1:
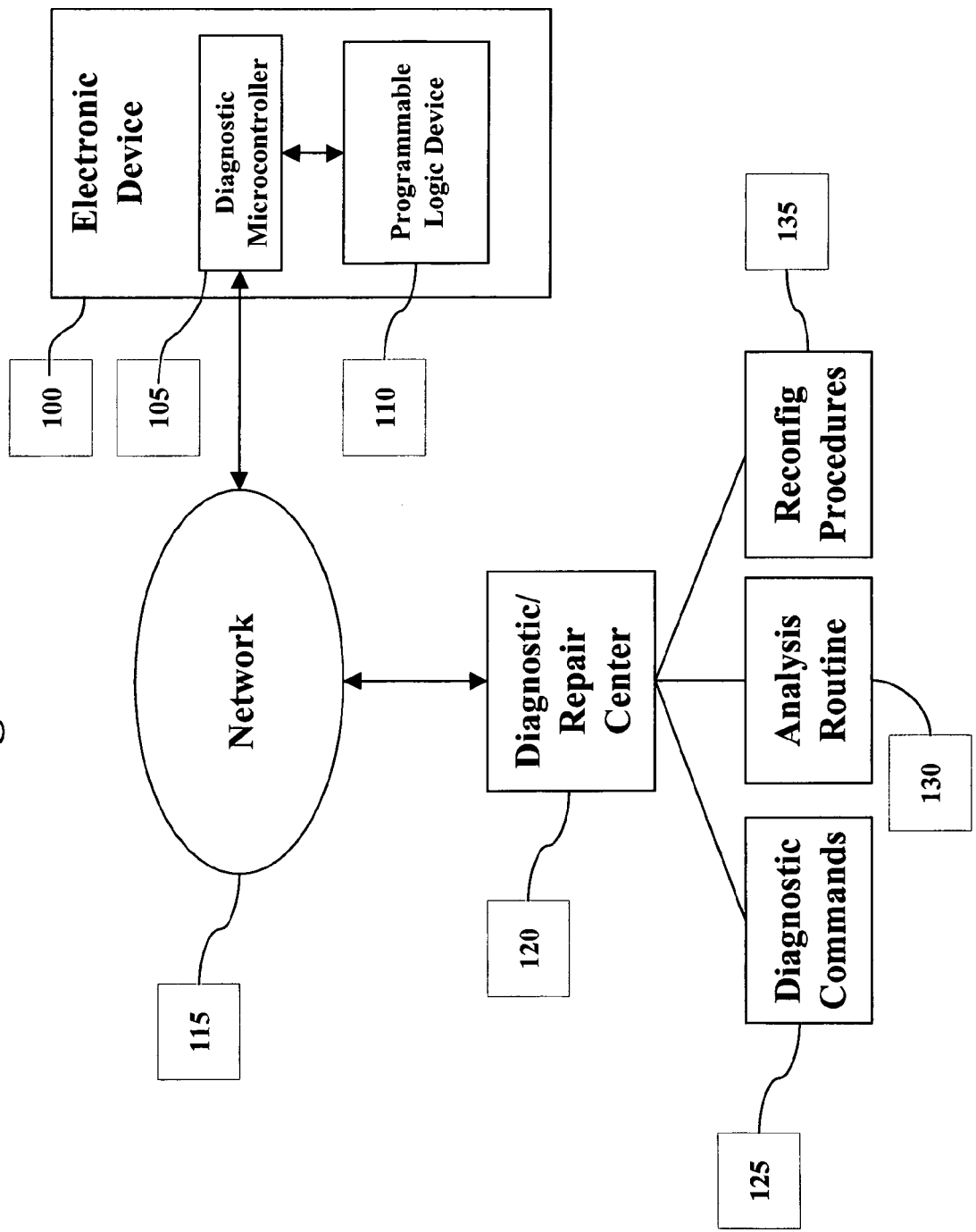

Illustrated in FIG. 1 is an exemplary overall system for diagnosing an electronic device 100 installed in the field or in a user's possession in accordance with the present invention. The electronic device 100 includes an embedded diagnostic microcontroller 105 that is configured to access and communicate to one or more programmable logic devices 110 within the electronic device 100. The microcontroller 105 includes logic that establishes and controls communication to a communication network 115. With an established connection to the network 115, communication is established with a diagnostic/repair center 120 and a diagnostic request is made.

After receiving the diagnostic request, the diagnostic/repair center 120 transmits diagnostic commands 125 to the microcontroller 105 from a remote location. The diagnostic microcontroller 105 then initiates diagnostic tests on the programmable logic device 110, or other components, to test its functionality. Results from the tests are collected and transmitted back to the diagnostic/repair center 120. An analysis routine 130 analyzes the results and determines if the programmable logic device 110 is functioning properly. If errors are found, corrective actions are taken which may include reconfiguring the programmable logic device 110 based on reconfiguration commands 135 transmitted by the diagnostic/repair center 120.

In one embodiment, the electronic device 100 is a self-contained product that is built with the features of the present invention thereby converting it to a remotely diagnosable/reconfigurable product. Exemplary electronic devices 100 include consumer products such as mobile telephones, wired telephones, pagers, personal digital assistants, computers, and the like. They also include larger systems, typically non-consumer products, such as communication switches, routers, gateways, firewalls, digital cellular base stations, line cards, PBX's, radio equipment, satellites and any other device that includes programmable logic devices.

The diagnostic/repair center 120 is a technical service computer center with one or more computers operated by technicians to facilitate diagnostics and repairs of a remote electronic device 100. It will be appreciated that the diagnostic/repair center can also be fully automated if desired. The diagnostic commands 125 of the diagnostic/repair center 120 include, for example, a database of test vectors, test signals, test algorithms and the like. In general, they are signals to be sent to the programmable logic device 110 for probing and/or stimulating it to generate output signals representative of a configuration and functionality of the programmable logic device 110. One or more diagnostic commands are associated for a selected electronic device 100 based on its type, e.g. manufacturer, model, serial number, etc. and/or based on the type of programmable logic devices contained within the electronic device. The technician can also generate custom diagnostic commands to accommodate a given situation.

The diagnostic commands 125, for example, can include any well known built-in self-test (BIST) based strategies for testing individual devices. This involves realizing test logic in the programmable logic device capable of verifying the correct functionality of the elements within the logic device. Other types of diagnostic commands include reconfiguration signals that configure one section of the programmable logic device to be responsible for the generation and application of a test stimulus to another section of the device under test. Other tests include using the INTEST instruction and the boundary-scan register in the logic device, or the RUNBIST instruction, test logic and a boundary-scan register. These and other tests are well known in the art.

Figure 2:
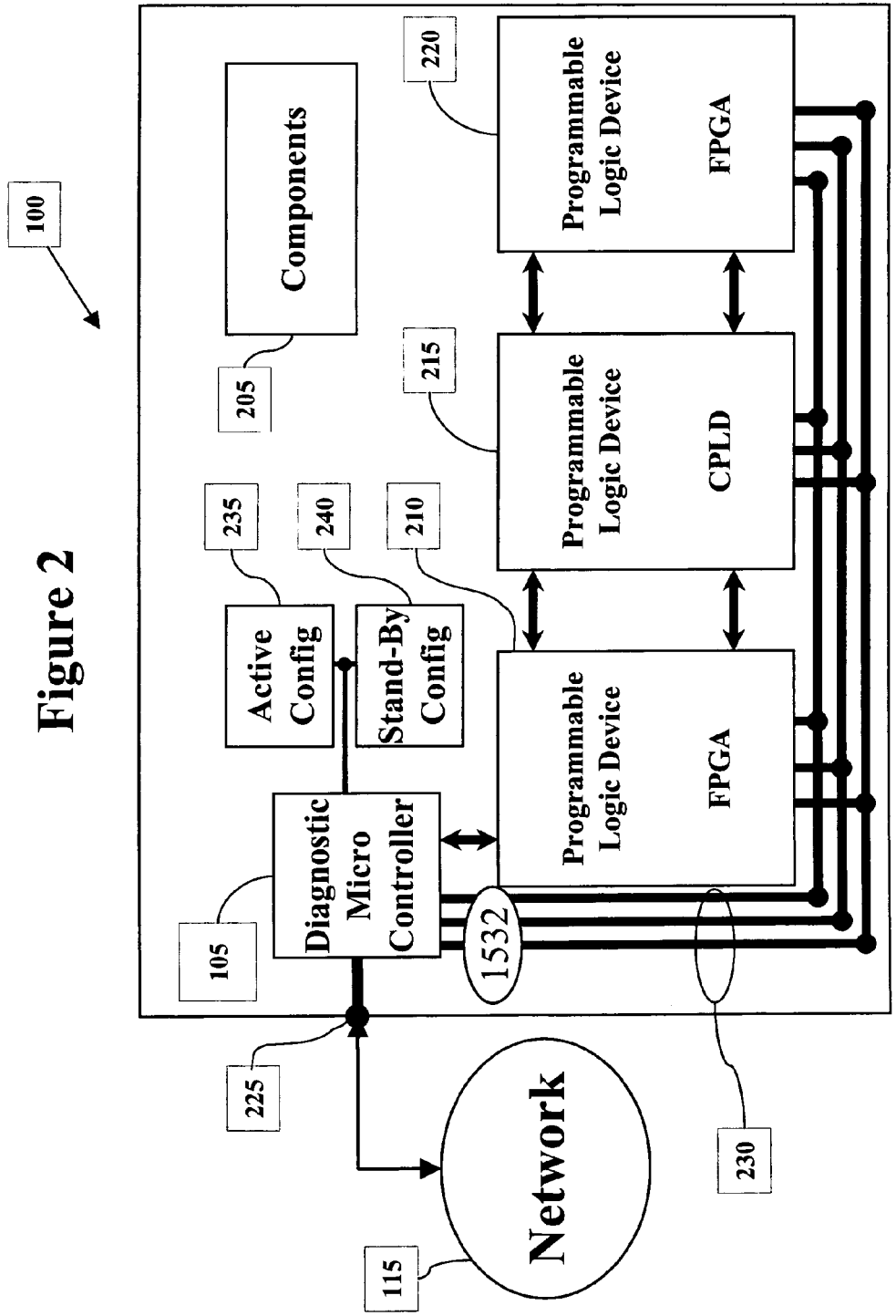
FIG. 2 is an exemplary component diagram of an electronic device in accordance with the present invention.

Illustrated in FIG. 2 is an exemplary component diagram of the electronic device 100 that is diagnosable and repairable over a communication network according to one embodiment of the present invention. Depending on the type of electronic device, it may include a plurality of components 205 that perform desired functions of the device. The electronic device 100 also includes one or more programmable logic devices (PLD), for example, PLD's 210, 215 and 220. As is known in the art, a programmable logic device is any device having configurable logic linked together via programmable interconnect. Memory cells control and define functions that the logic performs and how the functions are interconnected. For exemplary purposes, the programmable logic devices in the illustrated embodiment include FPGA's 210 and 220 (field programmable gate arrays) and a CPLD 215 (complex programmable logic device). Of course, other programmable logic devices may be used and may be configured and connected in any desired manner.

With further reference to FIG. 2, the diagnostic microcontroller 105 communicates to the network 115 through an external communication port 225 formed on the exterior of the electronic device 100 through a wire connection. It will be appreciated that wireless communication components can also be used in addition to or in place of the port 225 as is known in the art. To communicate to components within the electronic device 100, an internal communications bus 230 is connected to selected components, for example, to the programmable logic devices 210, 215 and 220. This connectivity and structure is designed when the electronic device is built. In this manner, the diagnostic microcontroller 105 has access to the programmable logic devices to perform diagnostic tests and, if necessary, reconfigure their logic. Of course, communications bus 230 can have any number of signal lines.

In one embodiment, the diagnostic microcontroller 125, the communications bus 230, and the programmable logic devices 210, 215 and 220 comply with IEEE Standard 1532. IEEE Standard 1532 describes a series of mandatory and optional programming instructions and associated data registers that define a standard methodology for accessing and configuring programmable devices. By using 1532-compliant devices, the configuration of the device, or chains of devices, is well defined functionally, behaviorally and algorithmically which simplifies communications to the device. Being compliant with IEEE Standard 1532 also requires compliance with the IEEE Standard 1149.1 communication protocol (commonly known as the boundary-scan standard or JTAG). Details of IEEE Standards can be found from the Internet at www.standards.ieee.org. Alternately, other standards may be used as is known in the art or as they become available. If no standard is used, a custom methodology would be configured and programmed for a specific electronic device to perform the communications to programmable logic devices.

With further reference to FIG. 2, an active configuration memory 235 stores current configuration settings for the programmable logic devices 210, 215 and 220 connected to the diagnostic microcontroller 105. A stand-by configuration memory 240 is provided to store new configuration settings that are to replace some or all of the configuration settings in the active configuration memory 235 in response to reconfiguration instructions. This will be described in greater detail below.

The memories 235 and 240 are they type that do not lose their contents when power is turned off. Exemplary memories include flash memory, other non-volatile memory types, a memory card, or the like. It will be appreciated that the active and stand-by configuration memories may be internal or external to the diagnostic microcontroller 105. The two memories can also be implemented as separate spaces or partitions within a single memory device. Their contents may be swapped, for example, by changing active pointers or addresses.

Figure 3:
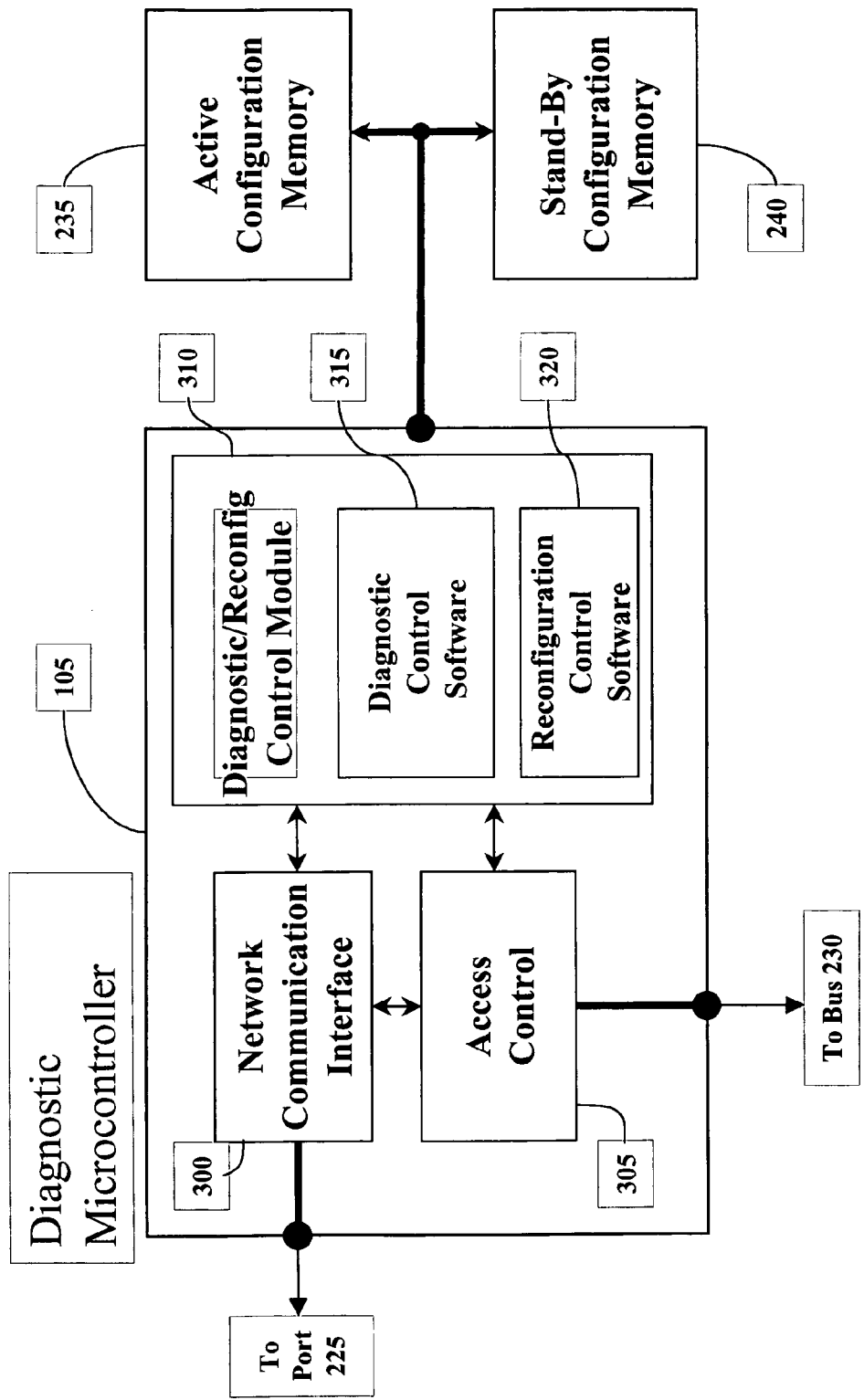
FIG. 3 is an exemplary component diagram of a diagnostic microcontroller shown in FIG. 2 in accordance with the present invention.

Illustrated in FIG. 3 is an exemplary embodiment of the diagnostic microcontroller 105 in accordance with the present invention. The diagnostic microcontroller 125 is, for example, a microprocessor operating under software control. One example is an 8-bit 8051 microprocessor that is an off-the-self product configured to have logic and programmed to perform functions including communicating with the network 115, communicating to components within the electronic device 100, controlling diagnostic tests, and reconfiguring programmable logic devices based on the diagnostic tests. Alternately, the microcontroller 125 is implemented using discrete logic and circuitry for performing these functions.

With further reference to FIG. 3, for communicating with the network 115, the diagnostic microcontroller 125 includes a network communication interface 300 in communication with the external communication port 225 of the electronic device 100. The network communication interface 300 controls communication between the microcontroller 105 and the network 115. The interface 300 includes, for example, logic for establishing a communication link and logic for transmitting and receiving signals in accordance with the type of network 115 being connected to and its communication protocol. Once communication with the network is established, the communication interface 300 communicates with the diagnostic control center 120 also connected to the network 115.

It will be appreciated that certain electronic devices 100 include standard network communication features. For example, a cellular phone with Internet access. In this case, the diagnostic microcontroller 105 can be modified to use those standard network communication features rather than its network communication interface 300 or even not include the interface 300.

For communicating with components within the electronic device 100, the diagnostic microcontroller 125 includes an access control module 305. The access control module 305 includes logic for communicating to and from the internal communication bus 230 and the programmable logic devices 210, 215 and 220 connected thereto. For example, implementing IEEE Standard 1532, 4–5 pins on the diagnostic microcontroller 105 are connected to corresponding signal lines on the internal communication bus 230. On the programmable logic device, the bus 230 is connected to at least configuration and test ports as described by IEEE Std 1532 and 1149.1.

In response to instructions from the diagnostic microcontroller 105, the access control module 305 transmits diagnostic signals to one or more of programmable logic devices 210, 215, and 220 to test their functionality and collects result signals outputted from the programmable logic devices. When implementing compliance with IEEE Standard 1149.1, which may or may not also include implementing IEEE Standard 1532, the access control module 305 includes logic for communicating to the programmable logic device to control the boundary scan logic.

With further reference to FIG. 3, the diagnostic microcontroller 105 includes a diagnostic/reconfiguration control module 310 which includes diagnostic control software 315 and reconfiguration control software 320. The diagnostic control software 315 includes logic that controls diagnostic processes performed on selected programmable logic devices. The reconfiguration control software 320 includes logic that controls reconfiguration processes performed on selected programmable logic devices. These processes are described in greater detail below.

Figure 4:
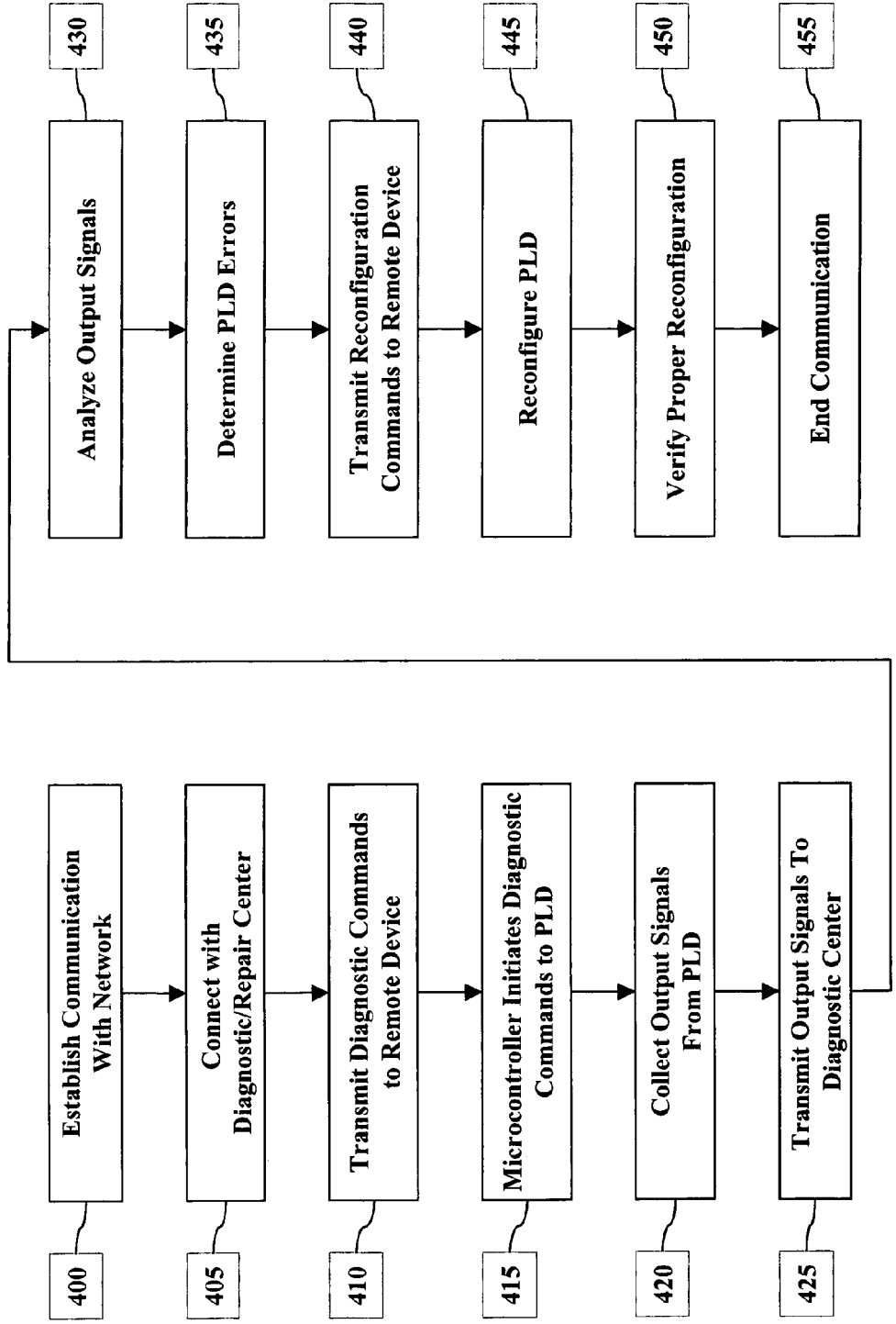
FIG. 4 is an exemplary process diagram of a remote diagnostic procedure in accordance with the present invention.

Illustrated in FIG. 4 is an overall exemplary methodology of the system shown in FIG. 1 for diagnosing a remote electronic device 100, and if appropriate, reconfiguring selected programmable logic devices 110 therein. As illustrated, the blocks represent functions, actions and/or events performed therein. It will be appreciated that electronic and software applications involve dynamic and flexible processes such that the illustrated blocks can be performed in other sequences different than the one shown.

For the following exemplary description, an exemplary electronic device 100 is a personal digital assistant (PDA) and the network 115 is the Internet. References are made to FIGS. 1 and 4. Suppose a user has a PDA 100 that seems to be functioning incorrectly. The PDA 100 includes the diagnostic microcontroller 105 and associated communication architecture and features as described above. To initiate a remote diagnosis of the PDA, a connection is established to the network 115 using a direct line or wireless link (block 400). Communication is then established with the diagnostic/repair center 120 (block 405) which identifies the PDA, for example, by model number, serial number, manufacturer, etc. Based on the identification, diagnostic commands 125 are retrieved and transmitted to the diagnostic microcontroller 105 (block 410).

The diagnostic control software 315 of the microcontroller 105 receives the diagnostic commands via the network communication interface 300. The diagnostic commands are then initiated to test one or more target programmable logic devices 210, 215, and 220 (block 415). This includes transmitting the diagnostic commands onto the internal communication bus 230 where they are inputted to a selected target device being tested. In response, the target programmable logic device generates one or more output signals. The output signals are captured and collected (block 420) from the internal communication bus 230 by the diagnostic control software 315.

With further reference to FIGS. 1 and 4, the collected output signals are transmitted to the diagnostic/repair center 120 (block 425). The analysis routine 130 analyzes the output signals to determine if the programmable logic device under test is configured properly and/or functioning properly (block 430). The analysis evaluates the behavior of the target device under test represented by the output signals, and determines if the behavior is correct, reflective of a known error, or reflective of an unknown error (block 435). For example, this is performed by comparing the output signals received to a correct set of signals that are expected from corresponding input signals (e.g. from the diagnostic commands used).

The analysis may also include comparing the output signals with a predetermined set of output signals that are the result of known errors. In other words, known errors in a configuration will have a certain behavior and produce a certain set of output signals for a given set of input signals. Thus, if the error is known in advance, it can be detected in a remote electronic device by comparing its output signals and/or behavior to the known set of error output signals. The evaluation may include input from a technician at the diagnostic/repair center 120 assisting with the diagnosis.

If a hardware error is found that is a known problem and/or if the error is repairable by reconfiguration, reconfiguration commands 135 are transmitted back to the diagnostic microcontroller 105 (block 440). For example, the reconfiguration commands include a configuration bit stream. The reconfiguration commands 135 may be a predetermined set of reconfiguration signals associated with a known problem, or might be generated by the technician looking at the diagnostic output or by modifying predetermined reconfiguration signals for a given situation. The commands 135 can also be driven by the analysis routine 130 evaluating the diagnostic output that determines the next course of action.

Once the reconfiguration commands are received, the reconfiguration control software 320 initiates reconfiguration of the target programmable logic device in accordance with known configuration procedures for logic devices (block 445). As a safety measure, the reconfiguration commands are loaded in the stand-by configuration memory 240 and verification is made that the reconfiguration commands were fully and properly received from the network. After verification, the commands are moved to the active configuration memory 235.

After reconfiguration, verification is made to ensure the reconfiguration was correctly performed (block 450). If no further errors were found, the communication with the network is ended (block 455).

If a software error is found during the analysis of output signals at block 435, a software update is transmitted to the diagnostic microcontroller 105. Software errors may include defective or outdated system software and/or application software that is running on the electronic device. This presumes that a software update is available. The software update is loaded by the diagnostic microcontroller 105 into the electronic device 100, re-booted, and the diagnostic commands are re-run to determine if the errors were corrected.

If an error is found that is not repairable by the diagnostic/repair center 120, a message is sent indicating that the electronic device 105 should be returned for repair. This may include transmitting a kill signal that disables the electronic device 100 so that the user is forced to return the device.

In some cases, the analysis routine 130 and or technician will conclude that the diagnostic output signals received are indeterminate and additional diagnostics are required. Here, reconfiguration commands 135 are used to reconfigure the target device under test in order to run additional diagnostics to determine what caused the original output signals. For example, some or all of the device under test is configured such that it has an expected behavior. Then, tests are run to determine if it behaves properly. By repeating this, portions of logic can be isolated and tested to identify problems.

Figure 5:
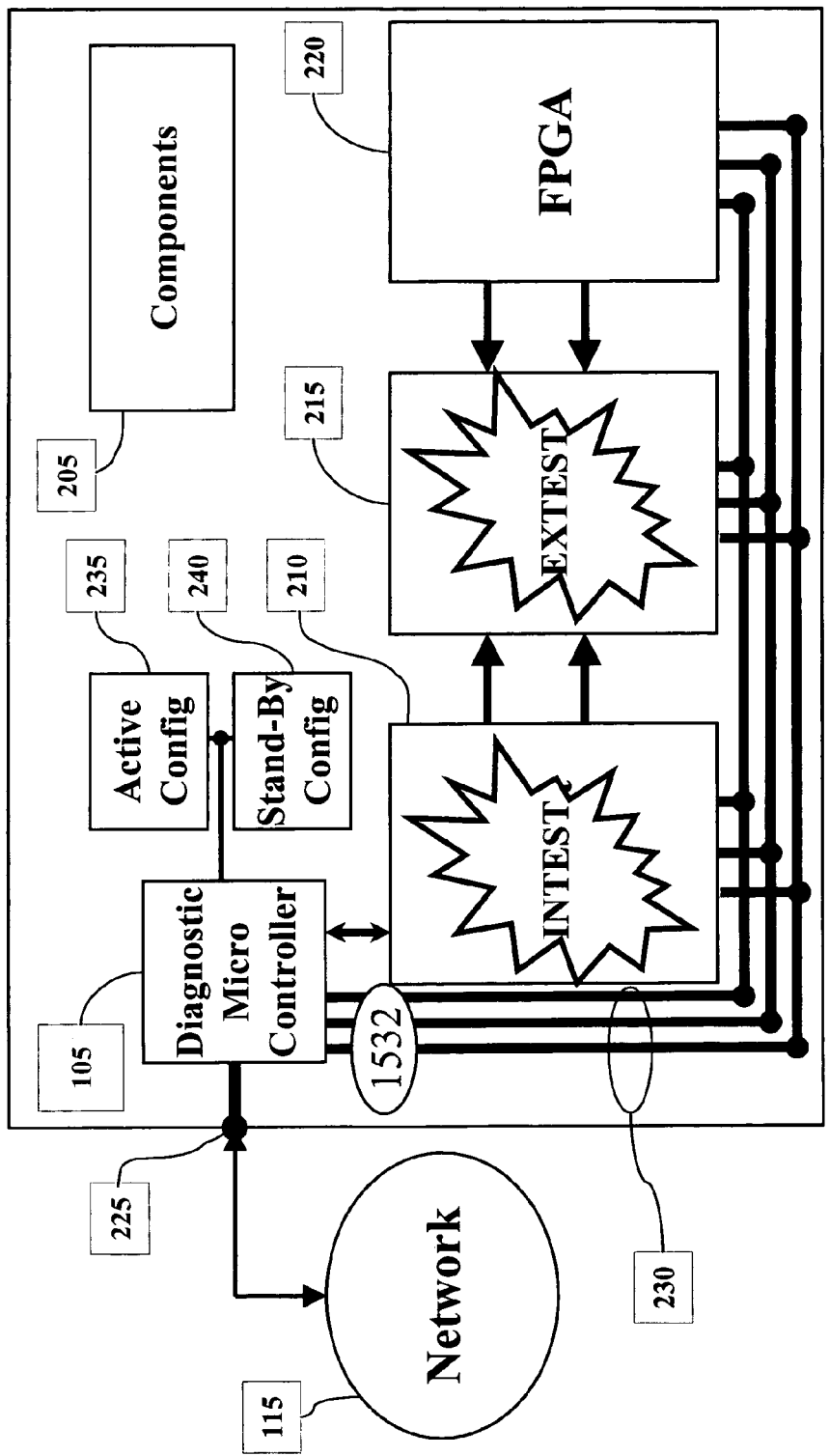
FIG. 5 is an exemplary component diagram of FIG. 2 representing a diagnostic test performed.

Illustrated in FIG. 5 is an exemplary representation of the electronic device 100 shown in FIG. 2 having diagnostic commands performed therein. In particular, FIG. 5 represents an INTEST and EXTEST performed therein. These tests are based on the programmable logic devices 210 and 215 having boundary-scan logic of IEEE Std 1149.1. In this example, diagnostic commands received from the diagnostic/repair center 120 include instructions to activate INTEST and EXTEST, respectively, to diagnose the associated devices. INTEST tests internal logic of a device and EXTEST tests the logic of an adjacent/neighboring device or system logic. These tests can be performed independent of each other. During an EXTEST, diagnostic commands include boundary scan signals that cause a programmable logic device to drive test stimulus signals to one or more neighboring devices.

Figure 6:
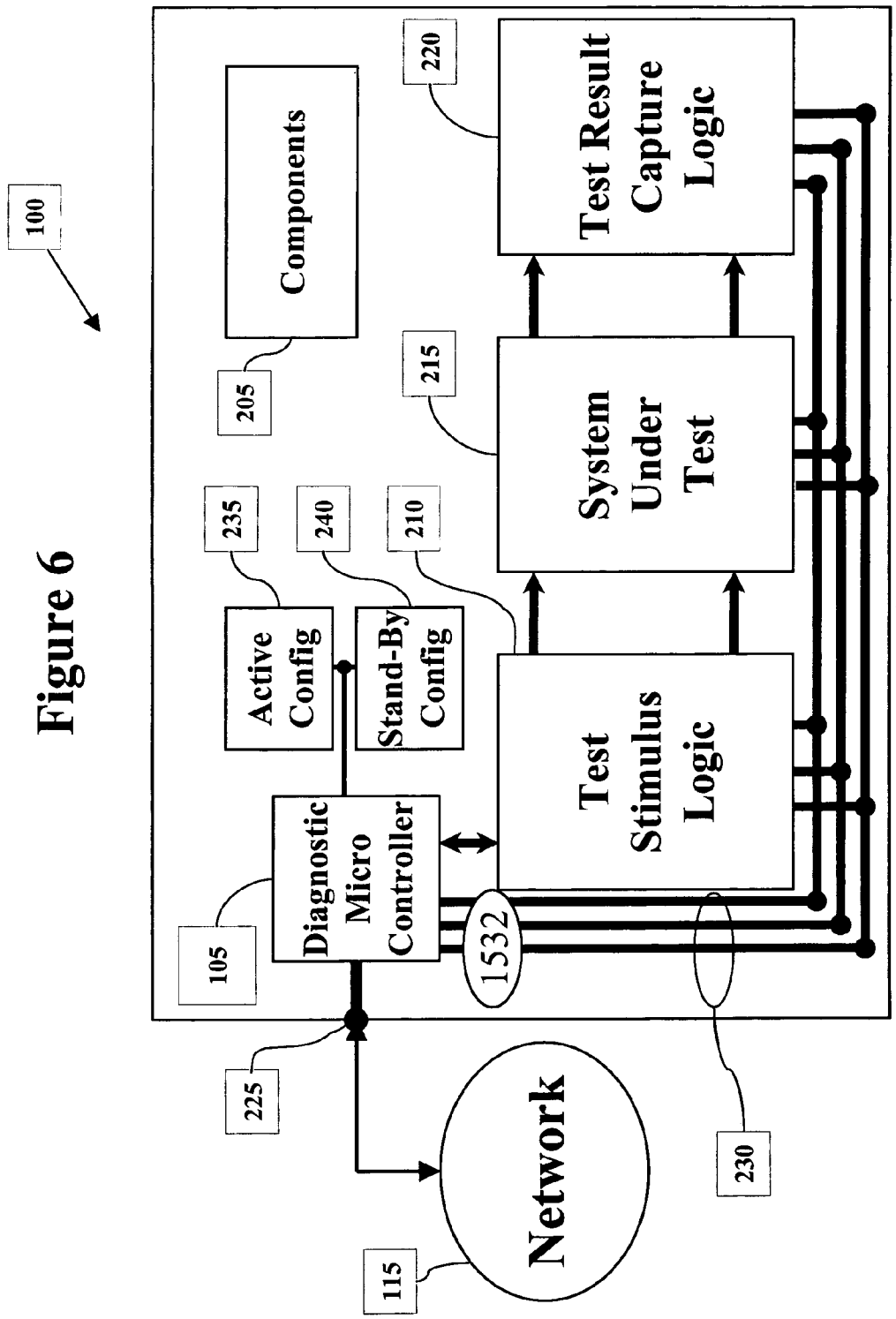
FIG. 6 is an exemplary component diagram of FIG. 2 representing another diagnostic test performed.

Illustrated in FIG. 6 is another exemplary representation of the electronic device 100 shown in FIG. 2 having diagnostic commands performed therein. In particular, diagnostic commands reconfigure a selected programmable logic device 210 to act as a test stimulus device that generates and drives test signals for input to one or more neighboring devices under test 215. The diagnostic commands may also reconfigure another programmable logic device to act as a test result capture device 220 to capture output from the device under test 215. In this sense, the diagnostic commands are reconfiguration commands that are processed by reconfiguration logic within the reconfiguration control software 320. Devices 210 and 220 are, for example, IEEE Std 1532 compliant devices and the device under test 215 can be any type, including a non-programmable logic device, for example, an ASIC chip.

In the example of FIG. 6, the test stimulus device 210 generates test stimulus signals that are inputted to the device under test 215. In response thereto, the device under test generates output signals. The test result capture device 220 then captures the output signals and transmits them to the diagnostic microcontroller 105. The output signals are then transmitted to the diagnostic/repair center 120 for analysis. If the device under test 215 is non-configurable, diagnostic results can be sent back but no repairs will be made.

By leveraging programmability and the possibility of performing the programming via the four (4) wire 1149.1 Test Access Port (TAP), system testability can be enhanced. It is similar to taking typical single device built-in self-test (BIST) approach and breaking it into its constituent parts then reassembling those parts in a system. This is accomplished through the creation of such standard test constructs as multiple input shift registers, linear feedback shift registers or other signature collection and calculation registers.

In addition, random or deterministic test vector generators and controlled frequency oscillators can be realized. These represent basic building blocks of system test. So applying the single device test and basic BIST mechanisms allows incorporation of BIST into the system without paying additional hardware costs. The 1532 compliant devices can be utilized for other mission functions after the BIST operations are complete. In addition, the BIST functionality can be recovered by reprogramming the 1532 devices.

The Xilinx family of FPGAs incorporates two user-available boundary-scan instructions. These can be utilized by system designers to implement special purpose boundary-scan triggered and controlled functionality. These two instructions (USER1 and USER2) are natural building mechanisms for the operation of the system BIST functions.

The presence of boundary-scan logic on any of the devices within the electronic device 100 in general also provides another possible resource that can be used. For instance, the SAMPLE instruction can be used to sample system signals at arbitrary times without interfering with the operation of the system BIST logic. In addition, the HIGHZ, CLAMP and EXTEST instructions could be used to drive and hold arbitrary values on system control pins and disable or enable system busses.

The following is a description of the hardware and functional elements in an IEEE Std 1532 compliant device that can be used for the present invention. IEEE Std 1532 is built on the foundation of IEEE Std 1149.1. This means that a 1532 compliant device must first be 1149.1 compliant. Upon that foundation, 1532 requires that the programmable device has well-defined externally observable behavior before, during and after the configuration process. To that end, the standard mandates how the configurable pins of the programmable device will behave at all times. In addition, it specifies when and how these pins will take on their programmed state.

System I/O pins of a 1532 compliant device have behavior summarized as follows:
  If an In-System Configurable (ISC) instruction is loaded, the system I/O pins take on either HIGHZ-like or CLAMP-like behavior according to the design of the device.
  If an IEEE Std 1149.1 test mode instruction (EXTEST, INTEST, RUNBIST, CLAMP, HIGHZ) is loaded, the system I/O pins are controlled as defined by that standard.
  If an IEEE Std 1149.1 non-test mode instruction (BYPASS, IDCODE, USERCODE, SAMPLE, PRELOAD) is loaded in the instruction register, the system I/O pin behavior is determined what ISC operation was being performed when the instruction was loaded.

When an IEEE Std 1149.1 non-test mode instruction is loaded in an ISC device, there is a choice of behaviors for the system I/O pins. These are summarized as follows:
  If the device is in the unprogrammed state, the system I/O pins are disabled.
  If the device is performing an ISC operation, the system I/O pins take on either HIGHZ-like or CLAMP-like behavior according to the design of the device.
  If the device is in the programmed and operational state, the system I/O pins operate as determined by the programming of the device.

A 1532 compliant device may have both ISC pins and fixed pins. In this case, the ISC pins behave as described above but the fixed pins behave according to the function of the core to which they are connected.

Figure 7:
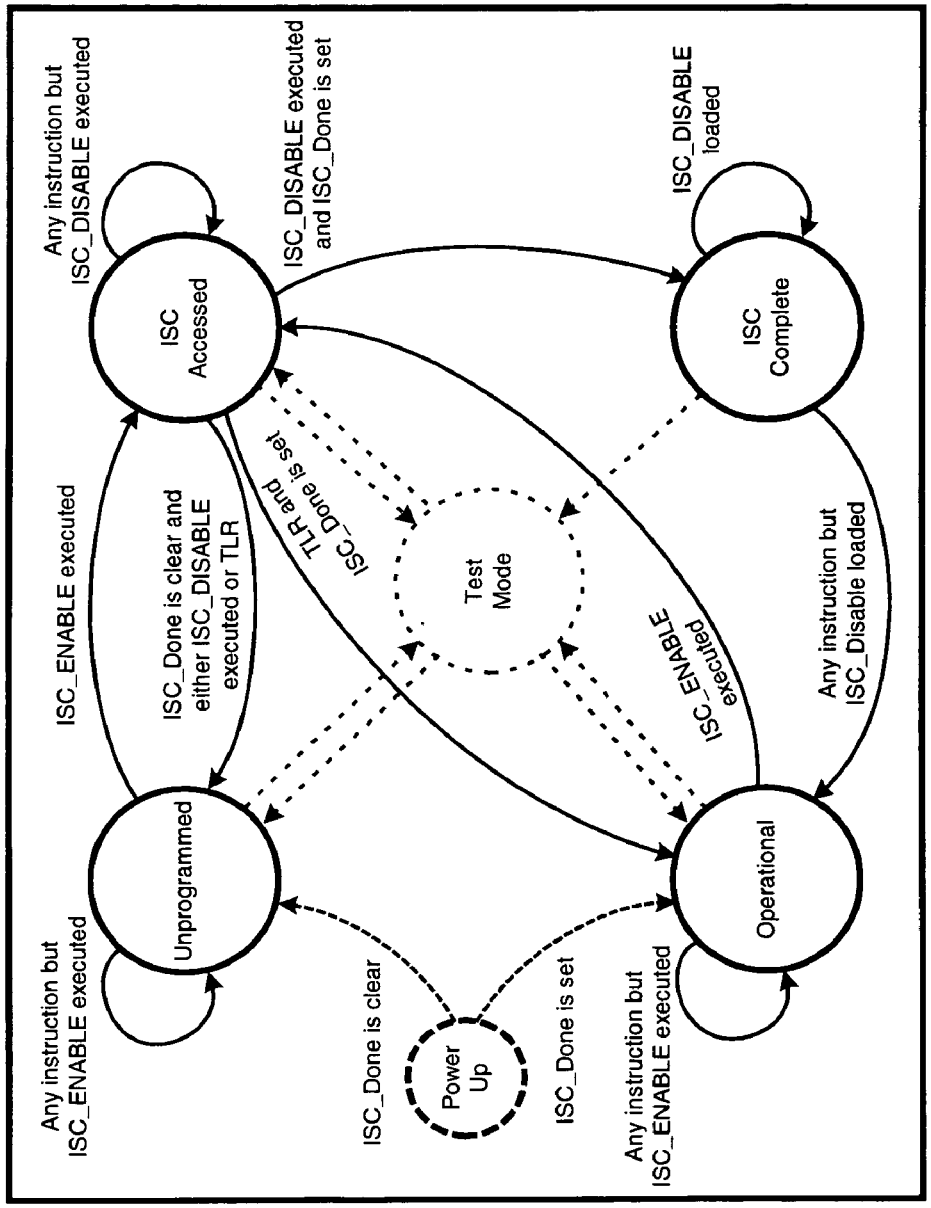
FIG. 7 is an exemplary state diagram of a programmable logic device that is compliant with IEEE Standard 1532.

With reference to FIG. 7, an illustration of four modal states of operation for an IEEE Std 1532 device are shown including the conditions for transition between the states. The states and transitions of a typical In-System Configurable (ISC) device are well defined by the standard. The standard defines four system modal states that correspond to the described states. The modal states include:

(1) Unprogrammed: In this system modal state, an ISC programmable logic device may be blank or incompletely programmed.
(2) ISC Accessed: In this system modal state, ISC instructions may be used to read, write, verify, protect or erase the device.
(3) ISC Complete: This system modal state exists so that an external algorithm can control transitions to the Unprogrammed or operational system modal states after ISC operations are complete.
(4) Operational: In this system modal state, the device is ready for its "operational" mode defined by its programming.

In order to configure a 1532 compliant device, a sequence of ISC instructions and data are loaded into the device. ISC operations are executed when the Test Access Port (TAP) controller is transitioned to a Run-Test/Idle State. In a simple implementation, an exemplary sequence of operations includes:
  1. Load ISC_ENABLE instruction.
  2. Load data associated with ISC_ENABLE instruction.
  3. Transition to and stay in the Run-Test/Idle TAP controller state for the prescribed amount of time.

This completes the device's preparation to begin performing ISC operations. The device's programmable system pins take on either a HIGHZ'ed or CLAMP'ed state.
  4. Load the ISC_ERASE instruction.
  5. Load data associated with the ISC_ERASE instruction.
  6. Transition to and stay in the Run-Test/Idle TAP controller state for the prescribed amount of time.

The above sequence erases the programmed contents of the device's configuration memory. Additional iterations through steps 5 and 6 may be required if the device has multiple sectors to erase.
  7. Load the ISC_PROGRAM instruction.
  8. Load the configuration data associated with the ISC_PROGRAM instruction.
  9. Transition to and stay in the Run-Test/Idle TAP controller state for the prescribed amount of time.
  10. Repeats steps 8 and 9 until the device's configuration memory has been completely programmed.

The above sequence loads the programmable device's configuration memory with the designed pattern.

11. Load the ISC_DISABLE instruction.

12. Transition to and stay in the Run-Test/Idle TAP controller state for the prescribed amount of time.

The above sequence marks the completion of the loading of the program pattern in the device's configuration memory. When the ISC_DISABLE instruction is displaced from the device's instruction register, the device will be operational. To accomplish this, the next step may be executed, the device should be operational and the system pins take on their programmed behaviors:

13. Load the BYPASS instruction.

With the present invention, electronic devices having programmable logic can be diagnosed and possibly repaired remotely using a network connection. This eliminates having to physically transport the electronic device to a repair center or having a technician make an on-site visit.

It will be appreciated that aspects of the present invention that may be implemented in software can be implemented in other ways than the illustrated embodiments. For example, the software may be implemented using various programming approaches such as procedural, object oriented or artificial intelligence techniques.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art.

For example, the diagnostic microcontroller 105 can include analysis capabilities to analyze diagnostic output results. In another embodiment, the diagnostic microcontroller 105 and associated communication architecture may be formed as a device separate from the electronic device rather than being embedded therein. In this manner, the present invention may be externally connected to pre-existing electronic devices. Another embodiment includes reconfiguring a programmable logic device within the electronic device to act as the diagnostic microcontroller. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A diagnostic device for diagnosing a programmable logic device that is embedded within an electronic system, the diagnostic device comprising:

an access controller configured to be embedded within an electronic system and for communicating to a programmable logic device embedded therein;

a diagnostic control module configured to be embedded within an electronic system and transmitting diagnostic signals via the access controller to the programmable logic device where the diagnostic signals are received from a network in response to a diagnostic request, the diagnostic control module including logic for collecting output signals generated by the programmable logic device in response to the diagnostic signals, and the output signals serving to diagnose the programmable logic device; and a reconfiguration control module coupled to the access controller for reconfiguring the programmable logic device based on output signals generated by the programmable logic device.

2. The diagnostic device as set forth in claim 1 wherein the access controller includes logic for communicating to the programmable logic device to control boundary scan logic within the programmable logic device.

3. The diagnostic device as set forth in claim 1 wherein the diagnostic signals include signals for performing boundary scan tests.

4. The diagnostic device as set forth in claim 1 wherein the diagnostic signals include boundary scan signals for causing the programmable logic device to drive stimulus signals to one or more neighboring devices within the electronic system.

5. The diagnostic device as set forth in claim 1 wherein the reconfiguration control module includes logic for reconfiguring the programmable logic device to function as a test stimulus device that generates stimulus signals for testing one or more neighboring devices.

6. The self-contained electronic device as set forth in claim 5 wherein the reconfiguration controller further includes logic for reconfiguring another programmable logic device within the self-contained electronic device to act as a test result capture device to capture signals outputted from the one or more neighboring devices in response to the test stimulus signals.

7. The diagnostic device as set forth in claim 1 further including a network communication interface for communicating to a network and receiving the diagnostic signals therefrom, and wherein the diagnostic control module includes logic for transmitting the output signals to a remote diagnostic device for analysis via the network communication interface.

8. The diagnostic device as set forth in claim 1 wherein the diagnostic signals are received from a remote diagnostic device in communication with the system.

9. The diagnostic device as set forth in claim 1 wherein access controller includes logic for communicating to the programmable logic device in compliance with IEEE Standard 1532.

10. The diagnostic device as set forth in claim 1 wherein the diagnostic device is a microprocessor configured to be embedded within an electronic system.

11. The diagnostic device as set forth in claim 1 wherein the diagnostic device is a programmable logic device reconfigured within an electronic system to include the access controller and the diagnostic control module.

12. A self-contained electronic device comprising:

a plurality of components selectively connected to each other to perform selected functions, the plurality of components including a programmable logic device;

a network communication interface for communicating to a network;

logic for receiving diagnostic commands from a remote diagnostic device in communication with the network communication interface; and a diagnostic controller embedded within the electronic device and in communication with the programmable logic device, the diagnostic controller including:

a diagnostic control module for performing a diagnostic test on the programmable logic device in accordance with the diagnostic commands; and a reconfiguration controller in communication with the programmable logic device, the reconfiguration controller including logic for reconfiguring the programmable logic device based on the diagnostic output signals.

13. The self-contained electronic device as set forth in claim 12 wherein the diagnostic commands include signals for performing a boundary scan test on the programmable logic device during the diagnostic test.

14. The self-contained electronic device as set forth in claim 12 wherein the diagnostic controller further includes logic for communicating to the programmable logic device to control boundary scan logic within the programmable logic device.

15. The self-contained electronic device as set forth in claim 12 wherein the diagnostic controller further includes logic for communicating to the programmable logic device in accordance with IEEE Standard 1532.

16. The self-contained electronic device as set forth in claim 12 wherein the reconfiguration controller further includes logic for reconfiguring the programmable logic device to drive test stimulus signals to one or more neighboring device within the electronic device.

17. The self-contained electronic device as set forth in claim 16 wherein the reconfiguration controller further includes logic for reconfiguring another programmable logic device within the self-contained electronic device to act as a test result capture device to capture signals outputted from the one or more neighboring devices in response to the test stimulus signals.

18. The self-contained electronic device as set forth in claim 12 wherein the diagnostic signals include boundary scan signals for causing the programmable logic device to drive stimulus signals to a neighboring device within the self-contained electronic device.

19. The self-contained electronic device as set forth in claim 12 wherein the diagnostic controller includes logic for collecting diagnostic output signals generated by the programmable logic device in response to the diagnostic commands.

20. The self-contained electronic device as set forth in claim 12 wherein the diagnostic controller is one of a microprocessor and a reconfigured programmable logic device.

21. A method of diagnosing an electronic system comprising the steps of:
communicating over a communications network to a remote electronic system that includes an embedded diagnostic/reconfiguration controller for performing diagnostic tests within the electronic system, the electronic system further including a programmable logic device that is configurable;
transmitting diagnostic commands to the remote electronic system that cause the diagnostic/reconfiguration controller to perform diagnostic tests on the programmable logic device where the programmable logic device generates output signals in response thereto;
receiving the output signals from the remote electronic system over the communications network;
analyzing the output signals to determine if errors exist in a functionality of the programmable logic device; and
transmitting reconfiguration commands to the remote electronic system causing the diagnostic/reconfiguration controller to reconfigure the programmable logic device based on the output signals analyzed.

22. The method of diagnosing as set forth in claim 21 wherein the analyzing includes comparing the output signals to predetermined signals in order to identify errors in the programmable logic device.

23. The method of diagnosing as set forth in claim 21 further including testing one or more neighboring devices connected to the programmable logic device by transmitting reconfiguration commands to the diagnostic/reconfiguration controller of the remote electronic system for reconfiguring the programmable logic device to drive test stimulus signals to the one or more neighboring devices.

24. The method of diagnosing as set forth in claim 21 wherein the transmitting diagnostic commands include transmitting boundary scan test signals.

25. The method of diagnosing as set forth in claim 21 wherein the transmitting diagnostic commands include transmitting commands that are compliant with IEEE Standard 1532.

26. An electronic system, comprising:
an electronic device;
at least one programmable logic device (PLD) embedded in the device and including programmable memory cells with values that defined a logic function implemented by the PLD;
a first memory embedded in the device and configured with configuration data of the programmable memory cells;
a second memory embedded in the device; and
a microcontroller embedded in the device and coupled to the at least one PLD and to the first and second memories, the microcontroller including a first interface adapted for communication via a network external to the device, and a second interface coupled to the at least one PLD and adapted for boundary scan input and output to and from the PLD, wherein the microcontroller is configured to execute first and second software modules, the first software module adapted to apply input signals to the at least one PLD responsive to diagnostic control received via the network and transmit output signals from the at least one PLD via the network, and the second software module adapted to store, responsive to reconfiguration control received via the network, configuration data received via the network in the second memory and reconfigure the PLD with the configuration data received via the network.

27. The system of claim 26, wherein the second software module is further adapted to reconfigure, responsive to reconfiguration control received via the network, a first set of configurable logic resources of a PLD embedded in the device to function as a test stimulus signal generator in the device.

28. The system of claim 27, wherein the second software module is further adapted to reconfigure, responsive to reconfiguration control received via the network, a second set of configurable logic resources of a PLD embedded in the device to capture states of signals input to the second set of configurable logic resources.

29. A method for testing an electronic device, comprising:
receiving diagnostic commands and reconfiguration commands via a network connection at a microcontroller embedded in the device;
executing a first software module in response to receipt of the diagnostic commands, and in executing the first software module applying input signals to at least one PLD embedded in the device and transmitting output signals from the at least one PLD via the network;
storing in a first memory embedded in the device a current configuration data set consistent with states of programmable memory cells that define a logic function implemented by the at least one PLD; and executing a second software module in response to receipt of a reconfiguration command, and in executing the second software module storing configuration data received via the network in a second memory embedded in the device and reconfiguring the PLD with the configuration data received via the network.

30. The method of claim 29, wherein the input of signals to the at least one PLD and receipt of output signals from the at least one PLD is via a boundary scan interface.

31. The method of claim 30, further comprising, reconfiguring, responsive to a reconfiguration command received via the network, a first set of configurable logic resources of a PLD embedded in the device to function as a test stimulus signal generator in the device.

32. The system of claim 31, further comprising, reconfiguring, responsive to a reconfiguration command received via the network, a second set of configurable logic resources of a PLD embedded in the device to capture states of signals input to the second set of configurable logic resources.

* * * * *